Aug. 27, 1935.  C. E. WYRICK  2,012,461

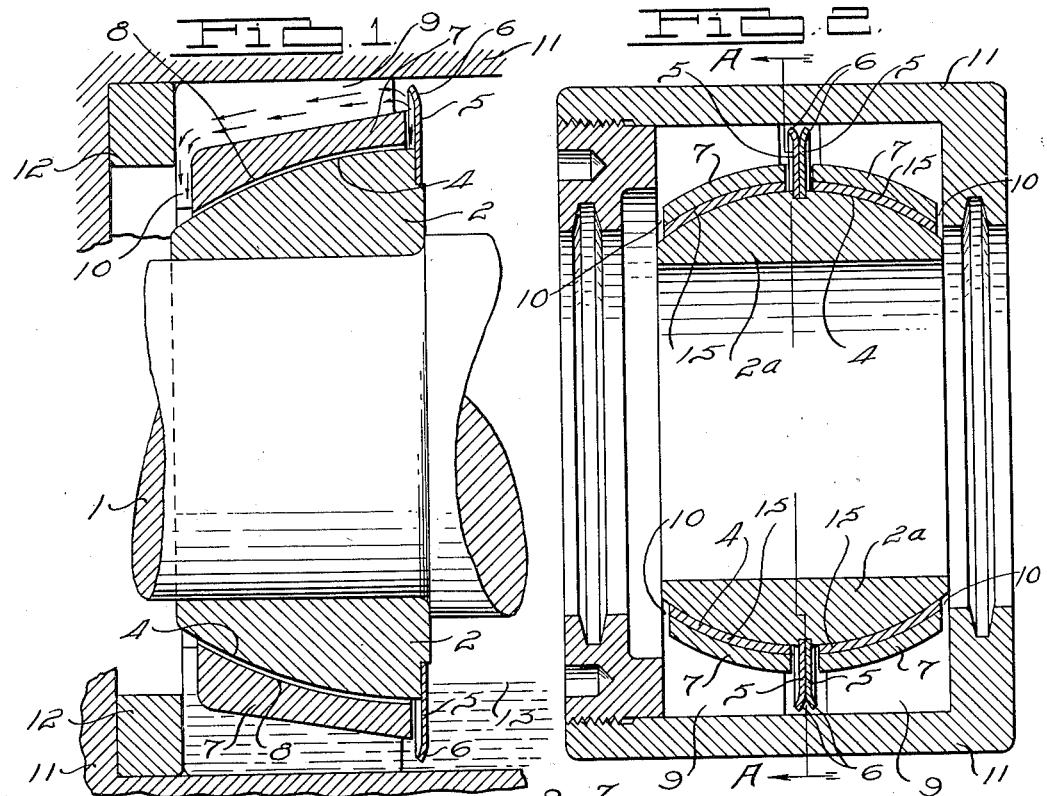
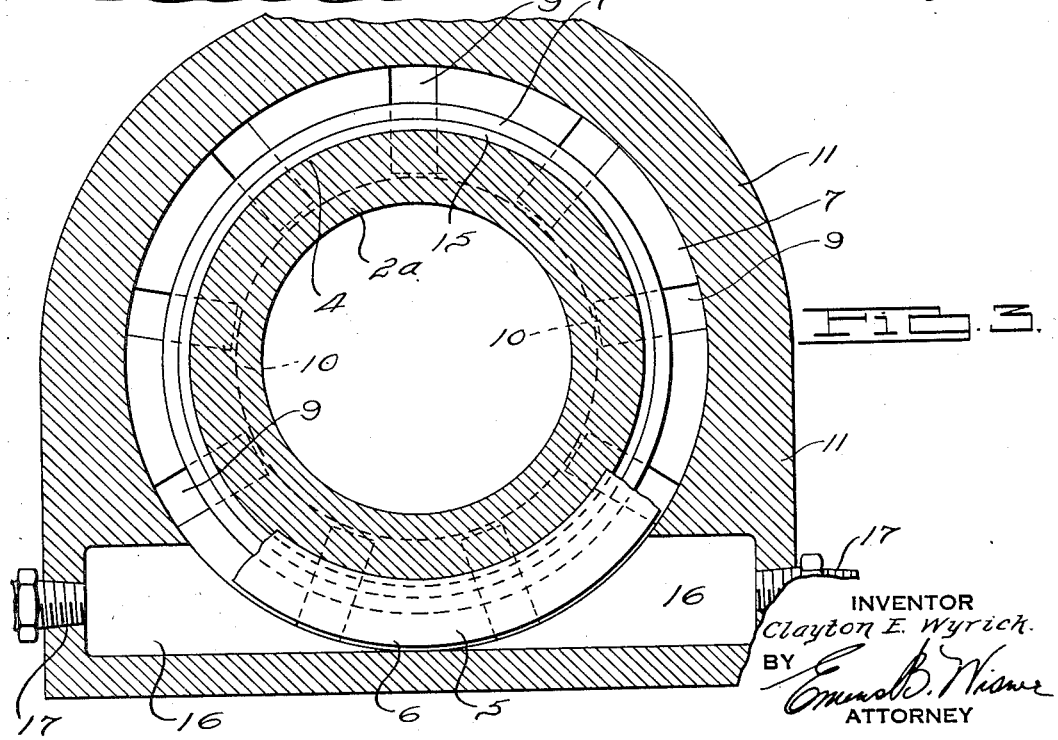

THRUST RADIAL BEARING

Original Filed July 20, 1932    2 Sheets-Sheet 2

INVENTOR
Clayton E. Wyrick.
BY
ATTORNEY

Patented Aug. 27, 1935

2,012,461

UNITED STATES PATENT OFFICE 2,012,461

THRUST RADIAL BEARING

Clayton E. Wyrick, Wyandotte, Mich., assignor to Wyrick Engineering Company, Wyandotte, Mich., a corporation of Michigan Application July 20, 1932, Serial No. 623,515
Renewed January 15, 1935

3 Claims. (Cl. 308—168)

This invention relates to thrust radial bearings and the object of the invention is to provide a bearing in which the oil is constantly fed through the bearing by rotation of one of the bearing members.

Another object of the invention is to provide a bearing which may be provided with a supply of oil and in which the oil is constantly fed through the bearing under pressure built up by centrifugal force caused by rotation of one of the bearing parts.

Another object of the invention is to provide a bearing in which the oil is distributed by the bearing about the circumference of the bearing to a point where the oil may pass between the bearing faces under pressure developed from centrifugal force built up by the rotating portion of the bearing.

A further object of the invention is to maintain a flow of oil between the bearing faces so that the bearing is practically supported on a film of oil, the arrangement being such that after the oil has passed between the bearing faces, the oil passes through a period of rest before being forced back into the space between the bearing faces.

Another object of the invention is to provide a bearing of either the vertical or horizontal type in which the bearing faces will be supplied by oil under pressure automatically and in which the pressure increases as the rotation of the rotatable portion of the bearing increases.

A further object of the invention is to provide a self aligning bearing.

These objects and the several novel features of the invention are hereinafter more fully described and claimed and the preferred form of construction by which these objects are attained is shown in the accompanying drawings in which—

Fig. 1 is a section through a single row bearing embodying my invention and showing a portion of the housing.

Fig. 2 is a section through a double row bearing enclosed in a housing and otherwise similar to that shown in Fig. 1.

Fig. 3 is a section through a double row bearing taken on line A—A of Fig. 2 but showing a different type of housing provided with an oil sump.

Fig. 5 is a section through a vertical bearing employing the same principles of operation utilized in the previous forms.

Figure 4:
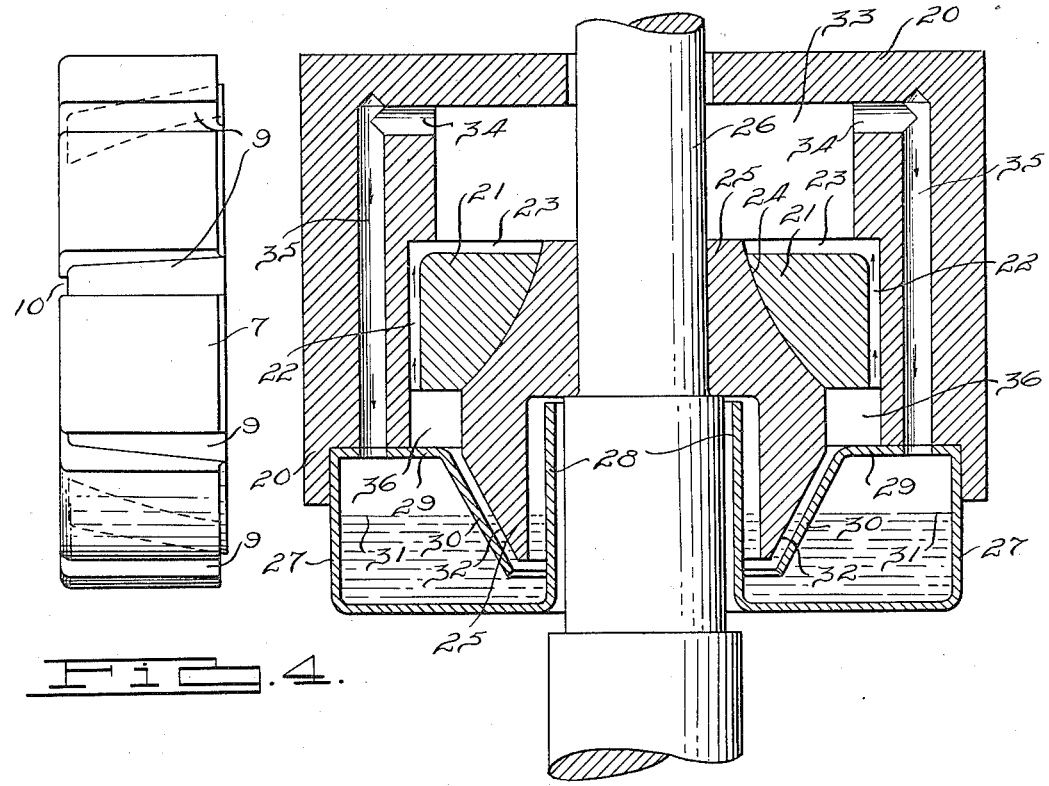
Fig. 4 is an elevation of the outer bearing member shown in Fig. 1.

A shaft 1 is indicated in Fig. 1 and is provided with an annular bearing member 2 secured thereto in any approved manner. This annular bearing member 2 is provided with a convex outer bearing face 4 and an annular flange or distributor ring 5 is secured to the end face of the bearing member 2 and is provided with an inturned outer edge 6 as shown. The bearing face of the bearing member 2 is so arranged that its greatest diameter is at the end to which the distributor ring 5 is secured and the opposite end of the bearing face is closer to the axis of the shaft 1. The outer stationary bearing member 7 is provided with a concave face 8 to fit the convex face of the bearing member 2 though the face 8 is shown spaced from the face 4 in order to indicate the oil flow. This outer bearing member 7 is provided with a series of radial slots 9 shown more particularly in Fig. 4 and each slot opens through the face of the outer bearing by means of a slot 10 which is a continuation of the slot 9. This outer bearing member is stationary and is positioned in a housing 11 and up against a spacer 12 or other ring-like member, though this is not absolutely necessary.

The bottom of the recess in which the bearing is positioned is then partially filled with oil up to approximately a line 13 shown in Fig. 1. At this time when the bearing starts rotating the distributor ring 5 distributes the oil about the periphery of the ring and about the face of the stationary portion of the bearing and is thrown toward the stationary bearing portion by the inturned edge 6. This oil, as indicated by the arrows shown at the top of Fig. 1, flows through the slot 9 and down the sloping bottom 14 of this slot and thence down through the portion 10 of the slot to a point between the bearing faces 8 and 4. As this oil falls onto the bearing face 4 of the rotating bearing member 2 it travels by centrifugal force up the convex face 4 of the member 2 thus providing lubricant between the two bearing faces. This movement of the oil is accentuated by centrifugal force produced by the rotating of the bearing member 2 and the oil passes out between the distributor ring 5 and the end face of the stationary bearing 7 from which point it will travel back through the slots 9 and 10 producing a complete circuit as indicated by the arrows shown in Fig. 1. As a multiplicity of radial slots 9 are provided, this oil flow occurs about the entire circumference of the bearing so that the rotating bearing is at all times supported on a film of oil. The rotation of the bearing itself, of course, will carry the oil about the circumference of the bearing face 4 and the oil enters a period of rest while passing through the slots 9 before being again fed between the bearing faces. This bearing is also self-centering and acts as a thrust bearing in which the pressure on the shaft may be endwise or radial.

By providing the slots 9 in the outer bearing member, an arrangement is provided for carrying heat to the outer bearing member and housing quickly, in that the hot oil coming from the bearing surfaces is thrown out against the housing and in passing back through the slots 9 helps to heat the housing and outer bearing member thus inducing expansion and allowing the housing and outer bearing member to expand sufficiently to lead the expansion of the journal. By this arrangement, no excess clearance need be allowed between the journal and outer bearing member and the bearing surfaces may thus be fitted closer together. Without the slots, the journal would tend to heat faster than the outer bearing member and housing and consequently greater clearance must be allowed for expansion.

The slots in the outer bearing member having a further feature in providing a bearing approximating a series of shoes in which the slotted areas being of lesser strength than the solid portions, will give slightly under load so that the curved outer bearing surface will more readily conform to the curved surface of the journal. Thus the load carrying capacity will be increased and should there be slight inaccuracy in machining the slotted areas will assist in permitting the solid sections to conform to the bearing surface of the journal. The bearing is also self-aligning when the bearing surfaces form a true portion of a sphere and the bearing will take both thrust or radial pressures.

In Fig. 2 a double row type bearing is shown in which two distributor rings 5 are provided for distributing the oil and two outer bearing members 7 are provided having slots 9 and 10 corresponding with similar slots shown in Fig. 1. In either type of bearing, a babbitt face 15 may be provided on the outer stationary bearing member 7 and the rotating bearing member 2a is composed of two bearing members 2 in a single unit instead of being divided. The operation in this type of bearing is the same as in the type shown in Fig. 1 as the distributor rings distribute the oil to the slots 9 from whence the oil passes through the slots 10 and outwardly between the bearing faces and thence out between the respective distributor ring and the end face of the corresponding stationary bearing member. In both types of construction the housing 11 may be provided with a recess 16 as shown in Fig. 3 to provide an oil sump from which the distributor rings may pick up the oil and in multiple bearing machines these sumps may be connected by conduits 17 as shown so that the oil may pass from one sump to another to be utilized by the different bearings. This oil sump is preferably of considerably less width than the bearing as full width is not required.

Figure 6:
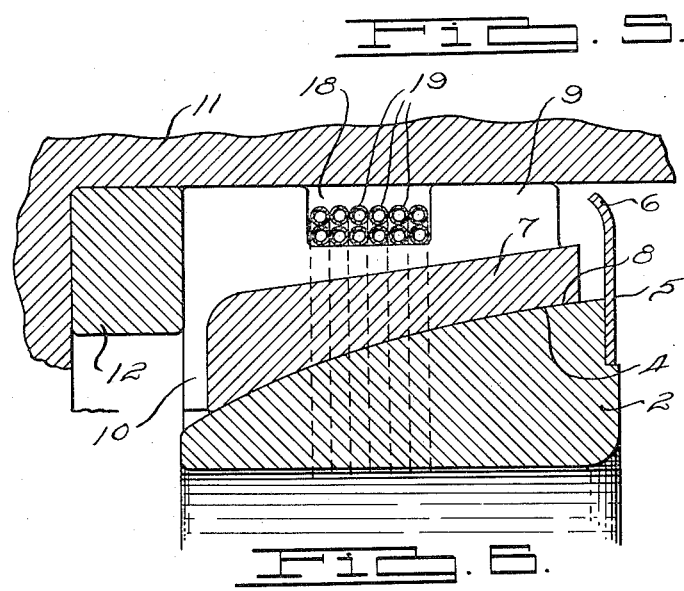
Fig. 6 is a section through a bearing similar to that shown in Fig. 1 and provided with means for cooling the oil.

In Fig. 6 the same type of bearing is shown as that shown in Fig. 1 with the exception that the outer stationary bearing is provided with an annular groove 18 in which pipe coils 19 may be positioned. As this bearing member is stationary, the coils will remain stationary and may be connected to allow cold fluid to flow therethrough. This arrangement tends to cool the oil during its flow through the slots 9 and coils and helps to maintain the bearing cool. In all other respects this bearing operates in the same manner as that shown in Fig. 1.

In Fig. 5, the same principle of operation is shown as applied to a vertical bearing. In this type of bearing, a housing 20 is provided having an inner bore into which the outer bearing member 21 is mounted. This member 21 is annular in form and is provided with radial grooves 22 having the same purpose as the grooves 9 shown in Fig. 1, and having radial grooves 23 similar to the grooves 10 in the member 7. This bearing member 22 is provided with a convex bearing face 24 and a rotatable bearing member 25 is secured to the shaft 26 and is provided with a companion concave face to conform to the convex face of the bearing member 21. An oil sump 27 is secured to the stationary bearing member 20 and is provided with an upwardly extending flange 28 about the shaft 26 and is also provided with an inwardly extending flange 29 terminating in a depending angular flange 30 as shown. This oil sump is preferably filled with oil to about the line 31 indicated in Fig. 5. The bearing member 25 is recessed to provide clearance about the flange 28 of the oil sump and is provided with an angular lower face extending at the same angle as the flange 30 of the oil sump. Above the bearing a recess 33 is provided in the casting 20 and conduits 34 lead therefrom to conduits 35 which lead down into the oil sump.

In operation, the shaft and bearing member 25 are rotated and due to centrifugal force the oil is forcibly thrown off from the face 32 of the bearing member 25 and will travel up the inclined space between the face 30 of the bearing member and the flange 30 of the sump. This will fill the annular pocket 36 and the pressure produced by centrifugal force will force the oil up through the slots 22. The oil will pass up through the slots 22 and 23 and into the chamber 33 and after the oil fills the chamber 33 it will pass through the conduits 34 and 35 back into the sump.

By this arrangement, a level of oil is maintained in the chamber 33 and can pass into the bearing faces between the rotating and stationary bearing members, 21 and 25, through the slots 23. As the oil passes between these faces the rotating member 25 by centrifugal force tends to feed the oil outwardly and downwardly between these bearing faces toward the annular pocket 36 and as oil is maintained in the chamber 33 by the device, there is a constant flow of oil between the friction faces of the bearing and any excess oil is delivered back to the sump from whence it is again forced upwardly into the chamber 33. As the speed of rotation of the bearing member 25 increases, the flow of oil increases and as the speed of rotation decreases, the flow of oil decreases in proportion, so that there is always a supply of oil between the bearing faces in accordance with the requirements. By this arrangement the lubrication is automatically supplied in accordance with the requirements of the bearing and as there is no possibility of the oil escaping there is very little opportunity for the bearing to run dry. In the types of bearing shown, the curved faces provide a self-centering bearing and when the bearing surfaces are a true portion of a sphere, then the bearing is also self aligning and the axis of the shaft may vary in position without affecting the function of the bearing. The same principle of operation may be utilized in which straight conical bearing faces are provided as the same action of the centrifugal force may be utilized to force oil under pressure between the bearing faces and support the bearing at all times on a film of oil.

The principle of operation of this device depends on the bearing faces being arranged in a sloping position in relation to the axis of rotation so that the oil passing between the bearing faces will be placed under pressure by centrifugal force to produce a flow of oil between the bearing faces and back to the point of origin.

From the foregoing description it becomes evident that the device is very simple and efficient in operation, will automatically maintain the bearing properly lubricated without attention and will prevent wear of the bearing members even under high speeds.

Having thus fully described my invention, its utility and mode of operation, what I claim and desire to secure by Letters Patent of the United States is—

1. In a thrust radial bearing, a rotatable bearing member having a curved face forming a true portion of a sphere in which the curved face at one end is closer to the axis of rotation than at the other, a distributor ring carried by the rotatable bearing member at the end of greatest diameter, a stationary bearing member having a companion face to fit the curved face of the rotatable bearing member, the stationary bearing member being provided with radial slots therethrough each sloping toward the end of smaller diameter of the rotatable bearing member and terminating at the curved bearing face of the rotatable bearing member and a housing about the stationary bearing member.

2. In a thrust radial bearing, a rotatable bearing member having a curved face extending at a greater distance from the axis of rotation at one end than at the other, a distributor ring secured to the rotatable bearing member at the end of greatest diameter, a stationary bearing member having a companion face to fit the curved face of the rotatable bearing member, the stationary bearing member being provided with slots therethrough leading to the end of smaller diameter of the rotatable bearing member and terminating at the curved bearing face of the rotatable bearing member, the bearing being adapted to be supplied with oil, the arrangement being such that as the rotatable bearing member is rotated a constant oil circulation is set up between the companion bearing faces.

3. In a thrust radial bearing, a rotatable bearing member having a sloping face, a distributor ring secured to one end of the rotatable bearing member, a stationary bearing member having a companion face to fit the sloping face of the rotatable bearing member, the stationary bearing member being provided with radial slots terminating at the bearing faces, the arrangement being such that as the rotatable bearing member is rotated, the oil is distributed by the distributor ring to pass through the slots of the stationary bearing member and thence between the companion faces of the rotatable and stationary bearing members.

CLAYTON E. WYRICK.